United States Patent Office 2,790,017
Patented Apr. 23, 1957

2,790,017

METHOD OF PRODUCING CRYSTALLINE NAPHTHALENE

Karl F. Lang and Paul Damm, Frankfurt am Main, and Johannes Turowski, Castrop-Rauxel, Germany, assignors to Rutgerswerke-Aktiengesellschaft, Frankfurt am Main, Germany No Drawing. Application March 19, 1953, Serial No. 343,486

Claims priority, application Germany August 4, 1949

8 Claims. (Cl. 260—674)

This invention relates to the production of crystallized naphthalene and it has particular relation to the production of naphthalene crystals from coal tar products by direct cooling with aqueous liquids.

In the commercial production of crystallized naphthalene from tar oils, in which naphthalene has been concentrated by fractional distillation, several methods have been used.

In one method, the hot tar fraction is placed in cooling boxes or the like and is then subjected to cooling for several days until crystallization of naphthalene is completed. The crystals thus formed are separated from the oil by draining and the crystalline material obtained as a solid residue is subjected to purification by centrifuging or by pressing in suitable presses at elevated temperature.

According to another known process, a hot naphthalene fraction obtained from coal tar is subjected to cooling with simultaneous agitation. The formation of crystals according to this process requires 12 to 24 hours depending on the construction of the mechanical agitator used. A crystal paste is thus formed, which is separated into oil and crude naphthalene crystals by centrifuging.

It was also suggested previously to introduce molten crude naphthalene into an agitating tank at a temperature of about 85° C. with an equal volume of water at approximately the same temperature, form an intimate mixture from the molten naphthalene and hot water by agitation, and subsequently run in cold water with slow agitation of the mass at such a rate that the temperature of the mixture slowly drops to about 65° C. during a period of about 8 hours. The resulting slurry was subjected to separation by centrifuging.

According to another previously suggested process, an intimate mixture of naphthalene and water is formed by agitation at a temperature of about 85° C., and the mixture thus formed is cooled at approximately the rate of 3° per hour by running in cold water until the temperature is reduced to about 65° C. in order to obtain crystalline scales of naphthalene.

Another previously suggested procedure consists in heating crude naphthalene having a melting point of about 64° C. to a temperature slightly above the melting point of naphthalene and then crystallize the naphthalene in the presence of 8% aqueous sodium hydroxide solution amounting to 200% by volume of the molten naphthalene. Around ⅓ of the alkaline solution is first mixed with the molten naphthalene at a sufficiently elevated temperature to prevent crystallization of the naphthalene. The remainder of the alkaline solution is gradually added at a lower temperature, for example ordinary temperature, to cause the naphthalene to slowly crystallize, and the crystals thus formed are separated by centrifuging.

According to another prior process suggested for the production of naphthalene crystals, molten crude naphthalene having a solidification point of 62° C. and containing approximately 61% of naphthalene is mixed with about 43% by volume (based on the volume of naphthalene) of 5% aqueous sodium hydroxide solution of about 65°–70° C. The mixture is gradually cooled by evaporation under reduced pressure so that the temperature is reduced in 9 hours to about 30° C. According to a modification of this process, the caustic soda solution is circulated through the molten naphthalene.

Finally it has also been suggested to wash naphthalene crystals in a centrifuge with water at a temperature somewhat below the melting point of the crystals or with dilute sodium hydroxide solution of about 40° C.

These known processes have various disadvantages, e. g. insufficient purity and/or unsatisfactory yield of the naphthalene crystals, and the necessity of unduly long crystallization periods.

It has now been found that the above disadvantages can be eliminated and naphthalene crystals of high purity can be obtained in increased yield and in a shorter period of time by proceeding according to the present invention as follows.

The raw material used is a tar fraction containing naphthalene, or a raw naphthalene recovered from a tar fraction by cooling and separation from oily ingredients, e. g. by draining or centrifuging. This raw material having a temperature above the melting point of naphthalene, e. g. about 85° C., is quickly mixed with a cold aqueous liquid, e. g. water of about 8° C., and cooled to a relatively low temperature, e. g. to about 25° C., preferably with the application of additional, indirect cooling. After said temperature is reached and the naphthalene crystals are formed, the resulting liquid system which contains naphthalene crystals, and dispersed oily particles mixed with aqueous liquid, is subjected to mechanical separation, preferably by centrifuging in order to separate and recover the naphthalene crystals, and during and/or after this separation the naphthalene crystals are washed with hot water of e. g. 90° C., in order to complete separation of impurities and thus increase purity of the naphthalene crystals.

The following examples describe some embodiments of the invention, to which the invention is not limited.

Example I 11.8 parts by weight of a naphthalene fraction obtained by distillation of coal tar and having a temperature of about 85° C. and a clarification point of 71° C. are quickly mixed under agitation with 18 parts by weight of water of about 8° C., and the mixture is subjected to indirect cooling until its temperature reaches about 25° C. This takes about 170 minutes. From the cooled mixture, the naphthalene crystals formed are separated by centrifuging and washed in the centrifuge with about 15 parts by weight of water of about 90° C., which is preferably applied in a condition dispersed with steam.

7.64 parts by weight of crystalline naphthalene having a solidification point of 79.0° C. are thus obtained, corresponding to a yield of 64.7% based on the weight of the naphthalene fraction used as starting material.

Example II 11.6 parts by weight of raw naphthalene obtained by indirect cooling and centrifuging from a naphthalene fraction, and having a solidification point of 78.07° C. are heated to about 85° C. and quickly mixed under agitation with 17.5 parts by weight of water of about 8° C. The mixture is indirectly cooled until the temperature reaches about 25° C., which requires about 170 minutes, and the naphthalene crystals formed are then separated from the liquid ingredients by centrifuging and washing with about 15 parts by weight of water of about 90° C.

Naphthalene crystals having a solidification point of 79.03° C. are thus obtained in an amount of 7.25 parts by weight, which amounts to a yield of 62.5% based on the weight of the raw naphthalene treated according to this example.

*Example III*

15 parts by weight of raw naphthalene having a solidification point of 72.8° C. and obtained by indirect cooling and separation from oily ingredients by draining, are heated to about 85° C. and quickly mixed with 22.5 parts by weight of water of about 8° C., under stirring. The mixture is cooled by additional indirect cooling during about 170 minutes to about 25° C. and the naphthalene crystals thus formed are recovered by centrifuging and washing the crystals with about 20 parts by weight of water of about 90° C. The naphthalene crystals thus obtained have a solidification point of 79.1° C. and their yield amounts to 60.6% based on the weight of the raw naphthalene treated.

*Example IV*

10,000 kg. of a coal tar naphthalene fraction having a clarification point of about 70° C. and a temperature of 80°–90° C., are mixed under stirring with 25,000 kg. of an aqueous NaOH solution of about 20° C. and a specific gravity of 1.15 which is introduced in a thin stream into the naphthalene fraction. Stirring is continued until the mixture is cooled to about 22° C. The naphthalene crystals are separated from the liquid ingredients by centrifuging and washing in the centrifuge with about 12,000–15,000 kg. of water of about 88°–90° C. Yield and purity of the naphthalene crystals are substantially similar to those stated in Example I.

*Example V*

10,750 kg. of a naphthalene fraction having a temperature of about 80° C., a clarification point of 70° C. and containing 77.1% naphthalene, are mixed under vigorous stirring with 15,000 kg. of water of about 8° C. After about 2 hours of continued stirring, the mixture is further cooled by indirect cooling for about 1 hour, in order to cool it to about 27° C. The naphthalene crystals formed are then separated by centrifuging and washing the crystals with about 15,000 kg. of water of 90° C. in the centrifuge. The yield of the naphthalene crystals, which have a solidification point of 79.0° C., amounts to about 73% based on the weight of the naphthalene fraction serving as starting material.

*Example VI*

9,780 kg. of a naphthalene fraction having a clarification point of 69° C. and containing about 75% of naphthalene, are cooled to about 25° C. by mixing the naphthalene fraction under vigorous stirring, for about 4 hours, with 20,000 kg. of water of about 10° C. The naphthalene crystals are then separated by centrifuging and washing the crystals in the centrifuge with about 15,000 kg. of water of 88°–90° C. The yield of the naphthalene crystals amounts to 70% based on the weight of the starting naphthalene fraction and the crystals have a solidification point of 78.2° C.

*Example VII*

In any of the procedures described in the above Examples I, II and III an aqueous solution containing about 10% by weight of sodium chloride and having a specific gravity of 1.07 is used as a cooling medium, the process being carried out in all other respects in the manner described in said Examples I, II, III. The yield and solidification point of the naphthalene crystals are substantially identical with those stated in said examples.

Instead of an aqueous solution of sodium chloride, other aqueous solutions having the above mentioned specific gravity and containing other salts, which do not form insoluble compounds with ingredients of the naphthalene fraction and have also otherwise no undesired effect on the latter, can be used as cooling medium. As examples of such salts, potassium chloride, calcium chloride, sodium or potassium orthophosphate, sodium or potassium acetate, sodium or potassium sulfate, and sodium or potassium fluoride, are mentioned.

*Example VIII*

In the process described in the above Example IV instead of the aqueous solution of NaOH, an aqueous solution containing an equivalent amount of KOH or an aqueous solution of a hydroxide of an alkaline earth metal, e. g. $Ca(OH)_2$ or $Ba(OH)_2$ is used, the other conditions described in Example IV being unchanged. An aqueous solution of alkali metal carbonate or bicarbonate, e. g. $K_2CO_3$, $Na_2CO_3$, $NaHCO_3$, can also be used.

*Example IX*

The processes described in any of the above Examples I–VIII can be carried out discontinuously or continuously. In order to proceed continuously, the naphthalene-containing starting material and the cold aqueous liquid are, for example, continuously introduced into a mixing device preferably provided with a stirrer, the mixture is subjected subsequently to indirect cooling, if desired, and then continuously introduced into a centrifuge for separation, washing and recovery of the naphthalene crystals.

In carrying out the present invention, it is particularly essential that cooling of the liquid naphthalene-containing material be brought about quickly and the crystals separated in the centrifuge be washed by a sufficiently hot washing medium. By applying in this manner a cold aqueous liquid, if desired with additional indirect cooling, the crystals are obtained in a form in which they can be easily separated from the liquid in the centrifuge and are suitable for efficient purification by a hot, aqueous washing fluid. According to the present invention crystalline naphthalene of high purity can be directly obtained in favorable yield from naphthalene fractions derived from tar, but the invention can be successfully applied also to the recovery of highly purified naphthalene from raw naphthalenes of any kind.

It will be understood that this invention is not limited to the starting materials, cooling and washing liquids, temperatures, times and other details specifically mentioned above and can be carried out with various modifications.

For example, the cooling liquid can be mixed with the molten naphthalene in any suitable manner, e. g. by introducing a stream of the cold aqueous liquid into the molten naphthalene-containing product, injecting the cooling liquid under the surface of the naphthalene-containing product, sprinkling the cooling liquid to the surface of the naphthalene-containing product, or in the manner described in Example IX. The aqueous cooling liquid can be used in a cycle, i. e. re-used for cooling after its separation from the naphthalene crystals. Furthermore, the process of the invention can be carried out with or without continuously agitating the material treated. The naphthalene containing starting material has to be subjected to the process of the invention in molten condition, preferably at a temperature in the range of 75°–90° C., the preferred temperature being about 85° C. The temperature can be higher than 90° C., however, such higher temperature has in general no advantage. Instead of washing the naphthalene in the centrifuge with hot water, a mixture of hot water with steam or a steam treatment can be used. The water used for washing the naphthalene crystals can contain a small amount of a wetting agent in order to increase the purifying effect. Any naphthalene removed from centrifuge by the action of the purifying medium can be recovered in conventional manner from the washing medium. Instead of water, a dilute aqueous solution, e. g. salt solution, can be used for washing and introduction of the washing medium into the centrifuge can be effected, for example, through perforated pipes or nozzles. If desired, the naphthalene crystals can be treated after the washing with an aqueous washing medium in the centrifuge with a small amount of solvent preferably with an organic solvent, e. g. solvent naphtha, which is subsequently removed from the crystals by the aqueous washing medium. Small amounts of water present in naphthalene resulting from the process of the invention, can be removed therefrom in conventional manner, for example by melting and treatment with a concentrated solution of caustic soda. The temperature of the aqueous cooling liquid should be low enough to secure quick cooling of the naphthalene-containing material. Temperatures of the aqueous liquid in the range of 5° to 30°, preferably in the range of 8° to 20° C. proved to give satisfactory results. As mentioned above, it is often preferable to use indirect cooling in addition to direct cooling in order to cool the naphthalene-containing material to a temperature in the range of 10 to 35°, preferably 15 to 25°. The duration of the cooling period varies, depending on the amount of aqueous cooling fluid and the degree of indirect cooling used. Indirect cooling can be carried out in a vessel provided with a cooling jacket or cooling coils or the like. In the mechanical separation of naphthalene crystals from the aqueous liquid, the use of centrifuging is preferred, but other separating devices, e. g. a suction filter, can also be used. The ratio between the naphthalene-containing material and aqueous cooling fluid varies between wide limits. In general the use of 1.5 to 3 parts, preferably 1.5 to 2 parts by weight of cooling liquid, for 1 part by weight of the naphthalene-containing material, has been found to give satisfactory results. These and other modifications can be made without departing from the scope of the invention as defined in the appended claims.

The oil and other ingredients present in the aqueous cooling liquid and/or in the aqueous washing liquid, can be easily separated from the aqueous phase in conventional manner, and the resulting aqueous liquids resulting from the separation can be reused in the process of the present invention.

By carrying out direct cooling with a cold aqueous liquid, in combination with the steps disclosed and in the above described novel manner according to the present invention, naphthalene crystals can be recovered from naphthalene fractions and crude naphthalenes in a purity and yield, which could not be attained by any of the processes known from the art.

Reference is made to co-pending application Ser. No. 181,692, filed by us on August 26, 1950, now abandoned, for "Method of Extracting Naphthalene From Tar Distillation Fractions," of which this is a continuation-in-part.

What is claimed is:

1. A method of obtaining naphthalene from a starting material selected from the group consisting of naphthalene fractions of tars and raw naphthalene, comprising cooling the naphthalene-containing product having a temperature of 75°–90° C., to a temperature in the range of 10°–35° C., said cooling being accomplished at least in part by quickly mixing said naphthalene containing product in molten condition with 1½ to 3 times its weight of an aqueous liquid having a temperature of 5°–30° C., in order to cause formation of naphthalene crystals, mechanically separating naphthalene crystals formed in the mixture, from liquid ingredients thereof and washing the crystals with a hot aqueous liquid, said aqueous cooling and washing liquids forming no insoluble compounds with ingredients of the naphthalene product and having no adverse effect on the same said cooling of the naphthalene-containing product being carried out over a period of about 3 to 4 hours.

2. A method as claimed in claim 1, in which the naphthalene-containing material is indirectly cooled, in addition to the direct cooling with the aqueous liquid.

3. A method as claimed in claim 1, in which mixing and cooling of the naphthalene-containing material with aqueous liquid and separation and recovery of the naphthalene are carried out continuously.

4. A method as claimed in claim 1, in which a naphthalene fraction obtained from coal tar is used as starting material.

5. A method as claimed in claim 1, in which molten raw naphthalene is used as starting material.

6. A method as claimed in claim 1, in which water is used as cooling liquid.

7. A method as claimed in claim 1, in which water is used as washing liquid.

8. A method of obtaining naphthalene from a starting material selected from the group consisting of naphthalene fractions of tars and raw naphthalene, comprising cooling the naphthalene-containing product having a temperature of about 85° C., to a temperature in the range of 15°–25° C., said cooling being accomplished at least in part by quickly mixing said naphthalene-containing product in molten condition with 1.5 to 2.0 times its weight of an aqueous liquid having a temperature of 15°–25° C., in order to cause formation of naphthalene crystals, mechanically separating naphthalene crystals formed in the mixture, from liquid ingredients thereof and washing the crystals with an aqueous liquid of a temperature moderately higher than the melting point of naphthalene, said aqueous cooling and washing liquids forming no insoluble compounds with ingredients of the naphthalene product and having no adverse effect on the same, said cooling of the naphthalene-containing product being carried out over a period of about 3 to 4 hours.

References Cited in the file of this patent

UNITED STATES PATENTS

| | | |
|---|---|---|
| 1,448,688 | Gould | Mar. 13, 1923 |
| 1,481,197 | Gould | Jan. 15, 1924 |
| 2,078,963 | Miller | May 4, 1937 |
| 2,163,581 | Boyd | June 27, 1939 |
| 2,207,752 | Miller | July 16, 1940 |
| 2,257,616 | Miller | Sept. 30, 1941 |
| 2,744,059 | Mayer | May 1, 1956 |

FOREIGN PATENTS

| | | |
|---|---|---|
| 380,990 | Great Britain | Nov. 14, 1931 |
| 620,753 | Great Britain | Mar. 30, 1949 |